US009380874B2

(12) United States Patent
Coffey

(10) Patent No.: US 9,380,874 B2
(45) Date of Patent: Jul. 5, 2016

(54) CABLE INCLUDING A SECURE PHYSICAL LAYER MANAGEMENT (PLM) WHEREBY AN AGGREGATION POINT CAN BE ASSOCIATED WITH A PLURALITY OF INPUTS

(71) Applicant: ADC Telecommunications, Inc., Shakopee, MN (US)

(72) Inventor: Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 394 days.

(21) Appl. No.: 13/937,304

(22) Filed: Jul. 9, 2013

(65) Prior Publication Data

US 2014/0019662 A1 Jan. 16, 2014

Related U.S. Application Data

(60) Provisional application No. 61/670,237, filed on Jul. 11, 2012.

(51) Int. Cl.
*G06F 3/00* (2006.01)
*A47B 91/00* (2006.01)
(Continued)

(52) U.S. Cl.
CPC ............... *A47B 91/005* (2013.01); *G02B 6/43* (2013.01); *G06F 13/4027* (2013.01)

(58) Field of Classification Search
CPC ... G02B 66/43; A47B 91/005; G06F 13/4007
USPC ..................... 725/80; 370/400; 709/224–226; 710/305–306
See application file for complete search history.

(56) References Cited

U.S. PATENT DOCUMENTS 5,052,940 A 10/1991 Bengal
5,161,988 A 11/1992 Krupka
(Continued)

FOREIGN PATENT DOCUMENTS

EP 1569494 8/2005
JP 2001297044 10/2001
(Continued)

OTHER PUBLICATIONS

Korean Intellectual Property Office, "International Search Report and Written Opinion", "from PCT Counterpart of U.S. Application No.", Oct. 24, 2013, pp. 1-12, Published in: KR.
(Continued)

*Primary Examiner* — Tammara Peyton
(74) *Attorney, Agent, or Firm* — Fogg & Powers LLC

(57) ABSTRACT

One embodiment is directed to a communication media including one or more communication paths extending from a first end to a second end and a first connector assembly terminating the first end of the one or more communication paths. The first connector assembly includes a physical layer management (PLM) interface that is isolated from signals on the one or more communication paths. The first connector assembly also includes a programmable processor coupled to a storage device and coupled to the PLM interface. The programmable processor is configured to perform secure communications with another device coupled to the PLM interface to communicate physical layer information regarding the communication media to the other device. An aggregation point can associate a first port on the other device to which the first connector assembly is inserted with the first connector assembly or the communication media using the physical layer information.

23 Claims, 6 Drawing Sheets

(51) Int. Cl.
  *G02B 6/43* (2006.01)
  *G06F 13/40* (2006.01)

(56) References Cited

U.S. PATENT DOCUMENTS

| | | | |
|---|---|---|---|
| 5,195,902 A | 3/1993 | Bengal |
| 5,299,944 A | 4/1994 | Larabell et al. |
| 5,394,503 A | 2/1995 | Dietz, Jr. et al. |
| 5,418,334 A | 5/1995 | Williams |
| 5,420,512 A | 5/1995 | Spillane et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka |
| 5,487,666 A | 1/1996 | DiGiovanni |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 6,002,331 A | 12/1999 | Laor |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,424,710 B1 | 7/2002 | Bartolutti et al. |
| 6,442,032 B1 | 8/2002 | Linares et al. |
| 6,499,861 B1 | 12/2002 | German et al. |
| 6,516,345 B1 | 2/2003 | Kracht |
| 6,522,737 B1 | 2/2003 | Bartolutti et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,684,179 B1 | 1/2004 | David |
| 6,725,177 B2 | 4/2004 | David et al. |
| 6,778,505 B1 | 8/2004 | Bullman et al. |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 6,993,417 B2 | 1/2006 | Osann, Jr. |
| 7,038,135 B1 | 5/2006 | Chan et al. |
| 7,039,028 B2 | 5/2006 | Chen et al. |
| 7,042,562 B2 | 5/2006 | Kiani et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B2 | 11/2006 | Gossett et al. |
| 7,153,142 B2 | 12/2006 | Shifris et al. |
| 7,159,026 B2 | 1/2007 | Lau et al. |
| 7,160,143 B2 | 1/2007 | David et al. |
| 7,193,422 B2 | 3/2007 | Velleca et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,254,652 B2 | 8/2007 | Anderson et al. |
| 7,266,087 B2 | 9/2007 | Wahl |
| 7,289,334 B2 | 10/2007 | Behrens et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,328,033 B2 | 2/2008 | Rappaport et al. |
| D564,966 S | 3/2008 | Shifris |
| 7,352,289 B1 | 4/2008 | Harris |
| 7,377,819 B1 | 5/2008 | Cooper et al. |
| 7,382,765 B2 | 6/2008 | Kennedy et al. |
| 7,401,985 B2 | 7/2008 | Aronson et al. |
| D575,743 S | 8/2008 | Shifris et al. |
| 7,411,405 B2 | 8/2008 | Nordin |
| 7,433,363 B2 | 10/2008 | Rosen et al. |
| 7,440,647 B2 | 10/2008 | Hosking |
| 7,445,389 B2 | 11/2008 | Aronson |
| 7,453,864 B2 | 11/2008 | Kennedy et al. |
| 7,468,669 B1 | 12/2008 | Beck et al. |
| 7,478,416 B2 * | 1/2009 | Edson .................. H02J 7/0065 370/401 |
| 7,479,032 B2 | 1/2009 | Hoath et al. |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,616,589 B2 | 11/2009 | Nagata et al. |
| 7,698,156 B2 | 4/2010 | Martucci et al. |
| 7,744,291 B2 | 6/2010 | Dybsetter et al. |
| 7,762,727 B2 | 7/2010 | Aronson |
| 7,765,348 B2 | 7/2010 | Dybsetter |
| 7,778,510 B2 | 8/2010 | Aronson et al. |
| 7,785,930 B2 | 8/2010 | Johnson |
| 7,787,774 B2 | 8/2010 | Nelson |
| 7,808,399 B2 | 10/2010 | McVey |
| 7,809,276 B2 | 10/2010 | Ekkizogloy et al. |
| 7,809,283 B2 | 10/2010 | Hahin et al. |
| 7,819,328 B2 | 10/2010 | Levinson |
| 7,839,266 B2 | 11/2010 | Hoglund et al. |
| 7,841,780 B2 | 11/2010 | Nelson et al. |
| 7,860,399 B2 | 12/2010 | Hsieh |
| 7,870,242 B2 | 1/2011 | Nguyen |
| 7,901,144 B2 | 3/2011 | Deng |
| 7,908,406 B2 | 3/2011 | Dybsetter |
| 7,920,788 B2 | 4/2011 | Nelson et al. |
| 7,933,518 B2 | 4/2011 | Li et al. |
| 7,957,649 B2 | 6/2011 | Dybsetter et al. |
| 7,957,650 B2 | 6/2011 | Pan et al. |
| 7,970,283 B2 | 6/2011 | Giaretta et al. |
| 7,978,800 B2 | 7/2011 | Douma et al. |
| 8,031,992 B2 | 10/2011 | Schrodinger |
| 8,037,173 B2 | 10/2011 | Tuckey et al. |
| 8,068,739 B2 | 11/2011 | Levinson |
| 8,083,417 B2 | 12/2011 | Aronson et al. |
| 8,107,822 B2 | 1/2012 | Noble |
| 8,111,999 B2 | 2/2012 | Ekkizogloy et al. |
| 8,135,282 B2 | 3/2012 | Hosking |
| 8,155,528 B2 | 4/2012 | Nelson |
| 8,165,297 B2 | 4/2012 | Hoffmann |
| 8,200,097 B2 | 6/2012 | Cole |
| 8,225,024 B2 | 7/2012 | Dybsetter |
| 8,229,301 B2 | 7/2012 | Hahin et al. |
| 8,233,793 B2 | 7/2012 | Nelson et al. |
| 8,250,246 B2 | 8/2012 | Brockmann et al. |
| 8,267,600 B2 | 9/2012 | Dybsetter et al. |
| 9,065,658 B2 * | 6/2015 | Caveney .................. H04L 12/10 |
| 9,207,417 B2 * | 12/2015 | Coffey ..................... G02B 6/43 |
| 2001/0001270 A1 | 5/2001 | Williams Vigliaturo |
| 2002/0138604 A1 | 9/2002 | Kopelovitz et al. |
| 2003/0046339 A1 | 3/2003 | Ip |
| 2003/0061393 A1 | 3/2003 | Steegmans et al. |
| 2003/0194912 A1 | 10/2003 | Ferentz |
| 2003/0197619 A1 | 10/2003 | Lawrence et al. |

(56) References Cited

U.S. PATENT DOCUMENTS

| | | | |
|---|---|---|---|
| 2003/0219033 A1 | 11/2003 | Silvester | |
| 2004/0024717 A1 | 2/2004 | Sneeringer | |
| 2004/0073597 A1 | 4/2004 | Caveney et al. | |
| 2005/0164548 A1 | 7/2005 | Spears et al. | |
| 2005/0186819 A1 | 8/2005 | Velleca et al. | |
| 2005/0190768 A1 | 9/2005 | Cutler | |
| 2006/0047800 A1 | 3/2006 | Caveney et al. | |
| 2006/0059293 A1 | 3/2006 | Wurzburg et al. | |
| 2006/0160395 A1 | 7/2006 | Macauley et al. | |
| 2006/0160396 A1 | 7/2006 | Macauley et al. | |
| 2006/0179144 A1 | 8/2006 | Nagase | |
| 2006/0185887 A1 | 8/2006 | Neujahr | |
| 2006/0203715 A1 | 9/2006 | Hunter et al. | |
| 2006/0227759 A1 | 10/2006 | Bohm et al. | |
| 2006/0253561 A1 | 11/2006 | Holmeide et al. | |
| 2006/0268507 A1 | 11/2006 | Takahashi | |
| 2006/0268747 A1 | 11/2006 | Van Haalen et al. | |
| 2006/0282527 A1 | 12/2006 | Chiou et al. | |
| 2007/0025306 A1 | 2/2007 | Cox et al. | |
| 2007/0058338 A1 | 3/2007 | Lee | |
| 2007/0117444 A1 | 5/2007 | Caveney et al. | |
| 2007/0153823 A1 | 7/2007 | Wojtowicz | |
| 2007/0162954 A1 | 7/2007 | Pela | |
| 2007/0189321 A1 | 8/2007 | Lee et al. | |
| 2007/0230452 A1 | 10/2007 | Hough et al. | |
| 2007/0274234 A1 | 11/2007 | Kubota | |
| 2008/0159738 A1 | 7/2008 | Lavranchuk | |
| 2008/0181136 A1 | 7/2008 | Watanabe et al. | |
| 2008/0181138 A1 | 7/2008 | Dalberg | |
| 2008/0219268 A1 | 9/2008 | Dennison | |
| 2008/0265915 A1 | 10/2008 | Clark et al. | |
| 2009/0074404 A1 | 3/2009 | Suryaputra et al. | |
| 2009/0195349 A1 | 8/2009 | Frader-Thompson et al. | |
| 2010/0020722 A1 | 1/2010 | Farkas et al. | |
| 2010/0040371 A1 | 2/2010 | Wu et al. | |
| 2010/0054157 A1 | 3/2010 | Farkas et al. | |
| 2010/0211665 A1 | 8/2010 | Raza et al. | |
| 2010/0215049 A1 | 8/2010 | Raza | |
| 2010/0215362 A1 | 8/2010 | Shimoosako et al. | |
| 2010/0238003 A1 | 9/2010 | Chan et al. | |
| 2010/0278530 A1* | 11/2010 | Kummetz | H04W 88/085 398/41 |
| 2011/0167269 A1 | 7/2011 | Baykal et al. | |
| 2011/0277001 A1 | 11/2011 | Kaluskar et al. | |
| 2012/0134366 A1 | 5/2012 | Caveney et al. | |
| 2013/0148976 A1 | 6/2013 | Patel et al. | |

FOREIGN PATENT DOCUMENTS

| | | |
|---|---|---|
| KR | 102008017170 | 2/2008 |
| KR | 101020053 | 9/2011 |
| WO | 2004105317 | 12/2004 |

OTHER PUBLICATIONS

European Patent Office, "Extended European Search Report", "from Foreign Counterpart of U.S. Appl. No. 12/705,497", Sep. 27, 2012, pp. 1-6, Published in: EP.
U.S. Patent and Trademark Office, "Final Office Action", "U.S. Appl. No. 12/705,497", Oct. 16, 2012, pp. 1-29.
U.S. Patent and Trademark Office, "Office Action", "U.S. Appl. No. 12/705,497", Apr. 17, 2012, pp. 1-31.
Chinese Patent Office, "First Office Action", "from Foreign Counterpart of U.S. Appl. No. 12/705,501", Sep. 5, 2012, pp. 1-24, Published in: CN.
European Patent Office, "Extended European Search Report", "from Foreign Counterpart of U.S. Appl. No. 12/705,501", Sep. 19, 2012, pp. 1-9, Published in: EP.
European Patent Office, "Extended European Search Report", "from Foreign Counterpart of U.S. Appl. No. 12/705,501", May 22, 2012, pp. 1-7, Published in: EP.
European Patent Office, "Extended European Search Report", "from Foreign Counterpart of U.S. Appl. No. 12/705,506", Oct. 11, 2012, pp. 1-9, Published in: EP.
U.S. Patent and Trademark Office, "Office Action", "U.S. Appl. No. 12/705,506", Jun. 28, 2012, pp. 1-32.
International Searching Authority, "International Search Report", "from Foreign Counterpart of U.S. Appl. No. 12/705,506", Sep. 30, 2010, pp. 1-9, Published in: WO.
Chinese Patent Office, "First Office Action", "from Foreign Counterpart of U.S. Appl. No. 12/705,514", Sep. 4, 2012, pp. 1-14, Published in: CN.
European Patent Office, "Extended European Search Report", "from Foreign Counterpart of U.S. Appl. No. 12/705,514", Oct. 11, 2012, pp. 1-6, Published in: EP.
U.S. Patent and Trademark Office, "Advisory Action", "U.S. Appl. No. 12/705,514", Nov. 14, 2012, pp. 1-4.
U.S. Patent and Trademark Office, "Final Office Action", "U.S. Appl. No. 12/705,514", Aug. 23, 2012, pp. 1-20.
U.S. Patent and Trademark Office, "Office Action", "U.S. Appl. No. 12/705,514", Mar. 15, 2012, pp. 1-25.
International Searching Authority, "International Search Report", "from Foreign Counterpart of U.S. Appl. No. 13/707,908", Mar. 21, 2013, pp. 1-9, Published in: WO.
Figueira et al., "10GE WAN PHY: Physical Medium Attachment (PMA)", "IEEE 802.3 Meeting, Albuquerque", Mar. 2000, pp. 1-42.
Dimitrov et al., "Embedded Internet Based System", 2008, pp. 103-107.
"Embedded Ethernet System Design Guide", Aug. 2008, Publisher: Silicon Laboratories.
"The Ethersmart Wildcard", "http://www.mosaic-industries.com/Products/WildCards/ETHx/", 2008, Publisher: Mosaic Industries, Inc.
Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.
Feuzeu et al., "A New Scheme for Interconnecting LANS With Label Switching Bridges", "Local Computer Networks, 2005. 30th Anniversary. The IEEE Conference on", Nov. 17, 2005, pp. 303-311, Publisher: IEEE, Published in: Sydney.
"IntelliMAC", May 2003, pp. 1-6, Publisher: Nordx/CDT.
Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.
Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.
Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.
Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.
Feltgen, "PCT Patent Application PCT/EP2009/009036: Method and Arrangement for Identifying at Least One Object", Dec. 16, 2009, pp. 1-25, Published in: WO.
"UPnP Device Architecture 1.1", Oct. 15, 2008, pp. 12-72, Publisher: UPnP Forum.

* cited by examiner

CABLE INCLUDING A SECURE PHYSICAL LAYER MANAGEMENT (PLM) WHEREBY AN AGGREGATION POINT CAN BE ASSOCIATED WITH A PLURALITY OF INPUTS

CROSS-REFERENCE TO RELATED APPLICATIONS

This application claims the benefit of U.S. Provisional Patent Application Ser. No. 61/670,237, filed on Jul. 11, 2012, which is hereby incorporated herein by reference.

BACKGROUND

Conventional physical layer management (PLM) systems are typically designed to track connections that are made at a patch panel. That is, historically conventional PLM systems have been "patch panel centric" and have not included functionality to track connections that are made at other types of devices and systems in a network. For example, such PLM systems typically do not automatically track connections that are made at a switch, router, hub, gateway, access point, server computer, end-user computer, appliance computers (such as network-attached storage (NAS) devices), and nodes of a storage area network (SAN) or other types of devices (also referred to here as "host devices" devices or just "hosts"). Although there are management systems that are used to manage and collect information about such hosts, such management systems are typically separate from the PLM systems used to track connections made at a patch panel.

SUMMARY

One embodiment is directed to a communication media including one or more communication paths extending from a first end to a second end and a first connector assembly terminating the first end of the one or more communication paths. The first connector assembly includes a physical layer management (PLM) interface that is isolated from signals on the one or more communication paths. The first connector assembly also includes a programmable processor coupled to a storage device and coupled to the PLM interface. The programmable processor is configured to perform secure communications with another device coupled to the PLM interface to communicate physical layer information regarding the communication media to the other device. The communication media also includes a second connector assembly terminating the second end of the one or more communication paths. An aggregation point can associate a first port on the other device to which the first connector assembly is inserted with the first connector assembly or the communication media using the physical layer information.

DRAWINGS

DETAILED DESCRIPTION

Figure 1:
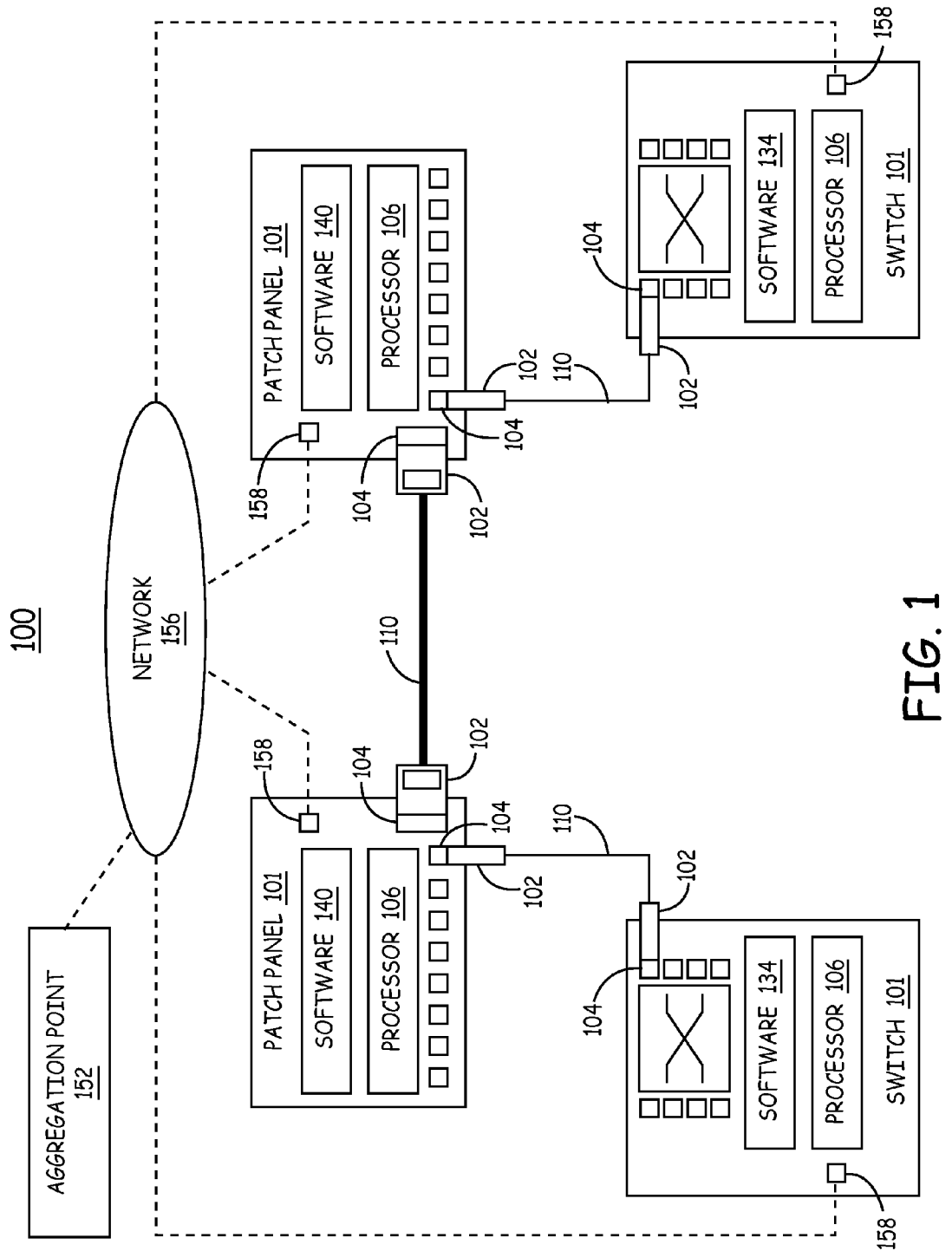
FIG. 1 is a block diagram of an example of a system including physical communication media with secured PLM information.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one example of a system 100 including physical communication media 110 with secured PLM information. The system 100 comprises a plurality of network entities 101, where each network entity 101 comprises one or more ports 104. Physical communication media 110 are used to communicatively couple the network entities 101 to one another.

Each segment of physical communication media 110 is attached to a respective port 104. Each port 104 is used to connect a segment of physical communication media 110 to the network entity 101 of which the port 104 is a part to another physical communication media (e.g., in a rack-mounted connector assembly or wall-mounted connector assembly). Examples of network entities 101 include, for example, rack-mounted connector assemblies (such as patch panels, distribution units, and media converters for fiber and copper physical communication media), wall-mounted connector assemblies (such as boxes, jacks, outlets, and media converters for fiber and copper physical communication media), and inter-networking devices (such as switches, routers, hubs, repeaters, gateways, and access points).

Each physical communication media 110 is a cable comprising one or more communication paths. The one or more communication paths can be formed by one or more fiber optics or one or more copper wires. As an example, the physical communication media 110 can be implemented using a simplex cable, a hybrid cable, a multi-channel cable, etc. Each physical communication media 110 includes a first connector 102 terminating a first end of the one or more communication paths and a second connector 102 terminating a second (opposite) end of the one or more communication paths. In examples where the one or more communication paths are fiber optics, the connectors 102 can be a corresponding passive optical connector or an active optical module for converting between optical signals and electrical signals. In examples where the one or more communication paths are copper wires, connectors 102 can be a corresponding electrical connector. As a cable, each physical communication media 110 is a connectorized media segment. As used herein, a "connectorized" media segment is a segment of physical communication media that includes a connector 102 at at least one end of the segment. The connectors 102 are used to facilitate the easy and repeated attachment and unattachment of the media segment 110 to a port 104.

Examples of connectorized media segments include CAT-5, 6, and 7 twisted-pair cables having modular connectors or plugs attached to both ends or optical cables having SC, LC, FC, LX.5, MTP, or MPO connectors. The techniques described here can be used with other types of connectors including, for example, BNC connectors, F connectors, DSX jacks and plugs, bantam jacks and plugs, and MPO and MTP multi-fiber connectors and adapters.

Example physical communication media 110 include duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables). Other example physical communication media 110 include coaxial cable. Still other examples include multiple-fiber cable including a multi-fiber connector (for example, a suitable MPO or MTP connector) at each end of such cable.

At least some of the network entities 101 are designed for use with segments of physical communication media 110 that have identifier and attribute information (also referred to herein as "PLM information") stored in or on them. The identifier and attribute information is stored in or on the segment of physical communication media 110 in a manner that enables the stored information, while the segment is attached to a port 104, to be read by a programmable processor 106 associated with the network entity 101. Examples of PLM information that can be stored in or on a segment of physical communication media 110 include, without limitation, an identifier that uniquely identifies that particular segment of physical communication media 110 (similar to an ETHERNET Media Access Control (MAC) address but associated with the physical communication media 110 and/or connector 102 attached to the physical communication media 110), a part number, a plug or other connector type, a cable or fiber type and length, a serial number, a cable polarity, a date of manufacture, a manufacturing lot number, information about one or more visual attributes of physical communication media 110 or a connector 102 attached to the physical communication media 110 (such as information about the color or shape of the physical communication media 110 or connector 102 or an image of the physical communication media 110 or connector 102), and other information used by an Enterprise Resource Planning (ERP) system or inventory control system. PLM information can also include testing or media quality or performance information which, for example, can be the results of testing that is performed when a particular segment of media 110 is manufactured. In other embodiments, alternate or additional data is stored in or on the media segments 110.

Also, as noted below, in some embodiments, the PLM information stored in or on the segment of physical communication media 110 can be updated. For example, the PLM information stored in or on the segment of physical communication media 110 can be updated to include the results of testing that is performed when a segment of physical media 110 is installed or otherwise checked. In another example, such testing information is supplied to an aggregation point 152 and stored in a data store maintained by the aggregation point 152. In another example, the PLM information stored in or on the segment of physical communication media 110 includes a count of the number of times that a connector 102 attached to a segment of physical communication media 110 has been inserted into port 104. In such an example, the count stored in or on the segment of physical communication media 110 is updated each time the connector 102 is inserted into port 104. This insertion count value can be used, for example, for warranty purposes (for example, to determine if the connector 102 has been inserted more than the number of times specified in the warranty) or for security purposes (for example, to detect unauthorized insertions of the physical communication media 110).

In the particular embodiment shown in FIG. 1, each of the ports 104 of the network entities 101 comprises a respective PLM interface via which the respective programmable processor 106 is able to determine if a physical communication media segment 110 is attached to that port 104 and, if one is, to read the identifier and attribute information (PLM information) stored in or on the attached segment (if such information is stored therein or thereon). The programmable processor 106 associated with each network entity 101 is communicatively coupled to each of the PLM interfaces using a suitable bus or other interconnect.

Each programmable processor 106 is configured to execute software or firmware 140 that causes the programmable processor 106 to carry out various functions described below. Each programmable processor 106 also includes suitable memory that is coupled to the programmable processor 106 for storing program instructions and data. In general, the programmable processor 106 determines if a physical communication media segment 110 is attached to a port 104 with which that processor 106 is associated and, if one is, to read the identifier and attribute information (PLM information) stored in or on the attached physical communication media segment 110 (if the segment 110 includes such information stored therein or thereon) using the associated PLM interface.

Each programmable processor 106 is also configured to communicate physical layer information to devices that are coupled to the IP network 156. The physical layer information (PLI) includes information about the network entities 101 associated with that programmable processor 106 (also referred to here as "device information") as well as information about any segments of physical media 110 attached to the ports 104 of those network entities 101 (also referred to here as "PLM information") The device information includes, for example, an identifier for each network entity 101, a type identifier that identifies the network entity's type, and port priority information that associates a priority level with each port. The PLM information includes identity and attribute information that the programmable processor 106 has read from attached physical media segments 110 that have identifier and attribute information stored in or on it. The PLI may also include information about physical communication media 110 that does not have identifier or attribute information stored in or on it. This latter type of PLI can be manually input at the time the associated physical media segments 110 are attached to the network entity 101 (for example, using a management application executing on the programmable processor 106 that enables a user to configure and monitor the network entity 101).

The system 100 includes functionality that enables the physical layer information that the network entities 101 capture to be used by application-layer functionality outside of traditional physical-layer management application domain. That is, the physical layer information is not retained in a PLM "island" used only for PLM purposes but is instead made available to other applications. In the particular embodiment shown in FIG. 1, the system 100 includes an aggregation point 152 that is communicatively coupled to the network entities 101 via the IP network 156.

The aggregation point 152 includes functionality that obtains physical layer information from the network entities 101 (and other devices) and stores the physical layer information in a data store.

The aggregation point 152 can be used to receive physical layer information from various types of network entities 101 that have functionality for automatically reading information stored in or on the segment of physical communication media 110. Examples of such network entities 101 are noted above. Also, the aggregation point 152 and aggregation functionality can also be used to receive physical layer information from other types of devices that have functionality for automatically reading information stored in or on the segment of physical communication media 110. Examples of such devices include end-user devices—such as computers, peripherals (such as printers, copiers, storage devices, and scanners), and IP telephones—that include functionality for automatically reading information stored in or on the segment of physical communication media.

The aggregation point 152 can also be used to obtain other types of physical layer information. For example, in this embodiment, the aggregation point 152 also obtains information about physical communication media segments 110 that is not otherwise automatically communicated to an aggregation point 152. One example of such information is information about non-connectorized physical communication media segments that do not otherwise have information stored in or on them that are attached to a network entity (including, for example, information indicating which ports of the devices are connected to which ports of other devices in the network as well as media information about the segment). Another example of such information is information about physical communication media segments that are connected to devices that are not able to read media information that is stored in or on the media segments that are attached to their ports and/or that are not able to communicate such information to the aggregation point 152 (for example, because such devices do not include such functionality, because such devices are used with media segments that do not have media information stored in or on them, and/or because bandwidth is not available for communicating such information to the aggregation point 152). In this example, the information can include, for example, information about the devices themselves (such as the devices' MAC addresses and IP addresses if assigned to such devices), information indicating which ports of the devices are connected to which ports of other devices in the network (for example, other network entities), and information about the physical media attached to the ports of the devices. This information can be provided to the aggregation point 152, for example, by manually entering such information into a file (such as a spreadsheet) and then uploading the file to the aggregation point 152 (for example, using a web browser) in connection with the initial installation of each of the various items. Such information can also, for example, be directly entered using a user interface provided by the aggregation point 152 (for example, using a web browser).

The aggregation point 152 can also obtain information about the layout of the building or buildings in which the network is deployed, as well as information indicating where each network entity 101 and physical media segment 110 is located within the building. This information can be, for example, manually entered and verified (for example, using a web browser) in connection with the initial installation of each of the various items. In one implementation, such location information includes an X, Y, and Z location for each port or other termination point for each physical communication media segment (for example, X, Y, and Z location information of the type specified in the ANSI/TIA/EIA 606-A Standard (Administration Standard For The Commercial Telecommunications Infrastructure)).

The aggregation point 152 can obtain and maintain testing, media quality, or performance information relating to the various segments of physical communication media that exist in the network. The testing, media quality, or performance information, for example, can be results of testing that is performed when a particular segment of media is manufactured and/or when testing is performed when a particular segment of media is installed or otherwise checked.

The aggregation point 152 also includes functionality that provides an interface for external devices or entities to access the physical layer information maintained by the aggregation point 152. This access can include retrieving information from the aggregation point 152 as well as supplying information to the aggregation point 152. In this embodiment, the aggregation point 152 is implemented as "middleware" that is able to provide such external devices and entities with transparent and convenient access to the PLI. Because the aggregation point 152 aggregates PLI from the relevant devices on the IP network 156 and provides external devices and entities with access to such PLI, the external devices and entities do not need to individually interact with all of the devices in the IP network 156 that provide PLI, nor do such devices need to have the capacity to respond to requests from such external devices and entities.

The aggregation point 152, in the embodiment shown in FIG. 1, implements an application programming interface (API) by which application-layer functionality can gain access to the physical layer information maintained by the aggregation point 152 using a software development kit (SDK) that describes and documents the API.

The IP network 156 is typically implemented using one or more inter-networking devices. As noted above, an inter-networking device is a type of network entity 101 and can be configured to read PLM information that is stored in or on the segments of physical media 110 that are attached to its ports and to communicate the PLM information it reads from the attached segments of media 110 (as well as information about the inter-networking device itself) to the aggregation point 152 like any other network entity 101 described here.

The aggregation point 152 can be implemented on a standalone network node (for example, a standalone computer running appropriate software) or can be integrated along with other network functionality (for example, integrated with an element management system or network management system or other network server or network element). Moreover, the functionality of the aggregation point 152 can be distribute across many nodes and devices in the network and/or implemented, for example, in a hierarchical manner (for example, with many levels of aggregation points).

Moreover, the aggregation point 152 and the network entities 101 are configured so that the aggregation point 152 can automatically discover and connect with the network entities 101 that provide PLI to an aggregation point 152 that are on the network 156. In this way, when network entities 101 that are able to provide PLI to an aggregation point 152 are coupled to the IP network 156, an aggregation point 152 is able to automatically discover the network entities 101 and start aggregating physical layer information for that network entity 101 without requiring the person installing the network entity 101 to have knowledge of the aggregation points 152 that are on the IP network 156. Similarly, when an aggregation point 152 is coupled to the IP network 156, the aggregation point 152 is able to automatically discover and interact with devices that are capable of providing PLI to an aggregation point without requiring the person installing the aggregation point 152 to have knowledge of the devices that are on the IP network 156. Thus, the physical-layer information resources described here can be easily integrated into the IP network 156.

In the example shown in FIG. 1, the programmable processors 106 in the network entities 101 are communicatively coupled to the network 156 by including a respective "management" or "non-service" port 158 that is separate from the "service" ports 104. However, one or more of the programmable processors 106 in the network entities 101 can be communicatively coupled to the network 156 using one or more of the "service" ports 104. In an example, the switches can communicate with the aggregation point 152 using a suitable communication protocol (such as the Simple Network Management Protocol (SNMP).

The aggregation point 152 can aggregate the PLI from the network entities 101 and physical communication media to associate ports of network entities 101 (e.g., patch panels) with physical communication media. For example, the PLI can be used to associate a given port of a network entity with a given physical communication media and/or a particular connector of the physical communication media. Aggregating the PLI can include aggregating multiple such associations to determine physical layer connections between devices.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

The IP network 156 can include one or more local area networks and/or wide area networks (including, for example, the Internet). As a result, the aggregation point 152 need not be located at the same site as the network entities 101.

Various conventional IP networking techniques can be used in deploying the system 100 of FIG. 1. For example, conventional security protocols can be used to secure communications if they are communicated over a public or otherwise unsecure communication channel (such as the Internet or over a wireless communication link).

In one implementation of the embodiment shown in FIG. 1, each network entity 101, each port 104 of each network entity 101, and each media segment 110 is individually addressable. Where IP addresses are used to individually address each network entity 101, a virtual private network (VPN) dedicated for use with the various network entities 101 can be used to segregate the IP addresses used for the network entities 101 from the main IP address space that is used in the IP network 156.

In the particular embodiment shown in FIG. 1, the system 100 also supports conventional physical layer management (PLM) operations such as the tracking of moves, adds, and changes of the segments of physical media that are attached to the ports 104 of the network entities 101 and providing assistance with carrying out moves, adds, and changes. PLI provided by the aggregation point 152 can be used to improve upon conventional "guided MAC" processes. For example, information about the location of the port 104 and the visual appearance (for example, the color or shape) of the relevant physical media segment 110 (or connector 102 attached thereto) can be communicated to a technician to assist the technician in carrying out a move, add, or change. This information can be communicated to a computer or smartphone used by the technician. Moreover, the PLI functionality that resides in the system 100 can also be used to verify that a particular MAC was properly carried out by checking that the expected physical media segment is located in the expected port 104. If that is not the case, an alert can be sent to the technician so that the technician can correct the issue.

The PLM functionality included in the system 100 can also support conventional techniques for guiding the technician in carrying out a MAC (for example, by illuminating one or more light emitting diodes (LEDs) to direct a technician to a particular network entity 101 and/or to a particular port 104 or by displaying messages on a liquid crystal display (LCD) included on or near the network entity 101. Other PLM functions include keeping historical logs about the media 110 connected to the network entity 101.

In addition to network entities 101, the techniques described here for reading PLM information stored in or on a segment of physical communication media 110 can be used in one or more end nodes of the network. For example, computers (such as, laptops, servers, desktop computers, or special-purpose computing devices such as IP telephones, IP multimedia appliances, and storage devices) can be configured to read PLM information that is stored in or on the segments of physical communication media 110 that are attached to their ports and to communicate the media information read from the attached segments of media 110 (as well as information about the devices themselves) to an aggregation point 152 as described here.

Figure 2:
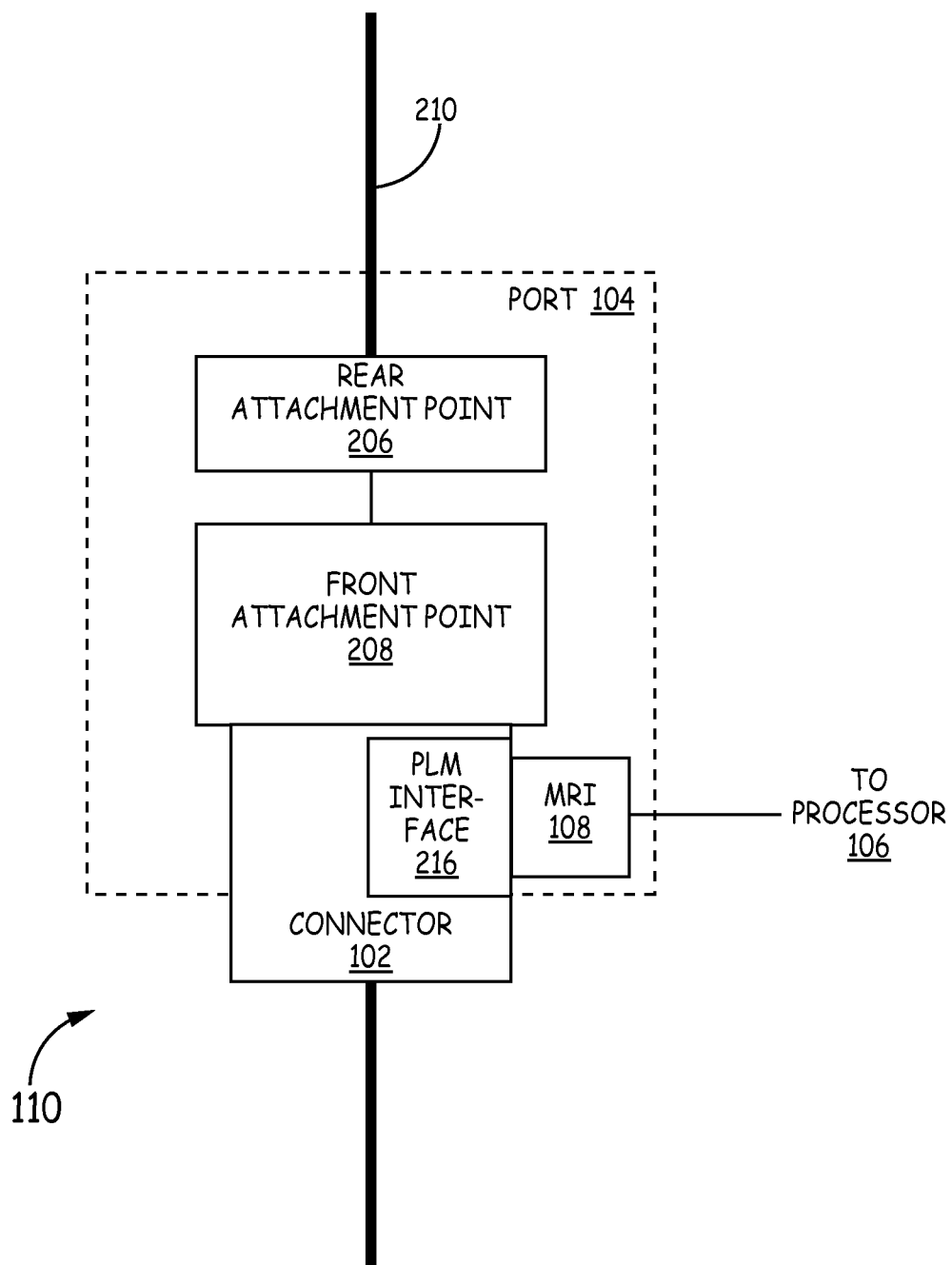
FIG. 2 is a block diagram of an example of a port in the system of FIG. 1.

FIG. 2 is a block diagram of one high-level embodiment of a port 104 and Media reading interface 108 that are suitable for use in the system 100 of FIG. 1.

Each port 104 comprises a first attachment point 206 and a second attachment point 208. The first attachment point 206 is used to attach one or more communication paths 210 to the port 104, and the second attachment point 208 is used to attach a segment of physical communication media 110 to the port 104. The one or more communication paths 210 can be part of a network entity 101 and connected to appropriate components within the network entity 101.

In the particular embodiment shown in FIG. 2, the first attachment point 206 is located near the rear of the port 104. As a consequence, the first attachment point 206 is also referred to here as the "rear attachment point" 206. Also, in this embodiment, the rear attachment point 206 is configured to attach the one or more communication paths 210 to the port 104 in a semi-permanent manner. As used herein, a semi-permanent attachment is one that is designed to be changed relatively infrequently, if ever. This is also referred to sometimes as a "one-time" connection. Examples of suitable rear connectors 206 include punch-down blocks (in the case of copper physical media) and fiber adapters, fiber splice points, and fiber termination points (in the case of optical physical media).

In the embodiment shown in FIG. 2, the second attachment point 208 is located near the front of the port 104. As a consequence, the second attachment point 208 is also referred to here as the "front attachment point" 208. In the embodiment shown in FIG. 2, the front attachment point 208 for each port 104 is designed for use with "connectorized" media segments 110 that have identifier and attribute information stored in or on them. The front attachment point 208 is implemented using a suitable connector or adapter that mates with the corresponding connector 102 on the end of the media segment 110. The connector 102 is used to facilitate the easy and repeated attachment and unattachment of the media segment 110 to the port 104. Examples of connectorized media segments include CAT-5, 6, and 7 twisted-pair cables having modular connectors or plugs attached to both ends (in which case, the front attachment point 208 is implemented using compatible modular jacks) or optical cables having SC, LC, FC, LX.5, MTP, or MPO connectors (in which case, the front attachment point 208 is implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Each port 104 communicatively couples the respective rear attachment point 206 to the respective front attachment point 208. As a result, one or more communication paths 210 attached to the respective rear attachment point 206 are communicatively coupled to any media segment 110 attached to the respective front attachment point 208. In one implementation, each port 104 is designed for use with one or more communication paths 110 and a media segment 110 that comprise the same type of communication path(s), in which case each port 104 communicatively couples the one or more communication paths 210 attached to the respective rear attachment point 206 to any media segment 110 attached to the respective front attachment point 208 at the physical layer level without any media conversion. In other implementations, each port 104 communicatively couples the one or more communication paths 210 attached to the respective rear attachment point 206 to any media segment 110 attached to the respective front attachment point 208 in other ways (for example, using a media converter if the rear one or more communication paths 210 and the media segment 110 comprise different types of communication paths).

As shown in FIG. 2, the port 104 is configured for use with media segments 110 that include a PLM interface 216 that, while the corresponding connector 214 is inserted into (or otherwise attached to) a front attachment point 208 of the port 104, communicatively couples a storage device or other component(s) to a corresponding media reading interface 108 so that the associated programmable processor 106 can obtain PLM information from the storage device or other component (s). In one implementation of the embodiment shown in FIG. 2, each connector 102 itself houses the storage device or other component(s) and the PLM interface can be implemented by incorporating appropriate electrical contacts in the connector 102.

In another implementation of such an embodiment, the storage device and other component(s) are housed within a housing that is separate from the connector 102. In such an implementation, the housing is configured so that it can be snapped onto the media segment 110 or the connector 102, with the PLM interface 216 positioned relative to the connector 102 so that the PLM interface 216 will properly mate with the media reading interface 108 when the connector 102 is inserted into (or otherwise attached to) the front attachment point 208.

Various examples of PLM interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line PLM interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and PLM interface are the storage devices and interfaces used in the QUAREO™ family of physical layer management products that are commercially available from TE Connectivity.

Example 1

Figure 3:
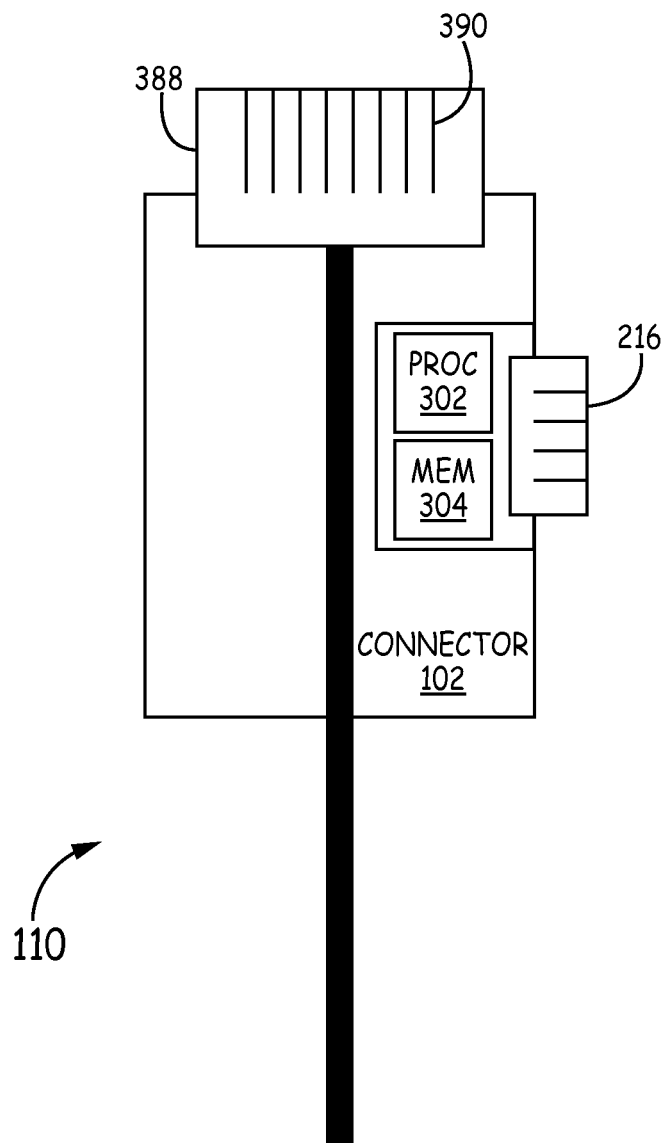
FIG. 3 is a block diagram of a portion of an example physical communication media having secured PLM information for use in the system of FIG. 1.

FIG. 3 is a diagram illustrating one embodiment of one end of a communication media 110 that is suitable for use in the system 100 of FIG. 1. In this example, the connector 102 comprises a contact portion 388 in which eight, generally parallel electrical contacts 390 are positioned. The connector 102 also comprises (or is attached to) a programmable processor 302 that is coupled to a storage device 304. The programmable processor 302 can include any suitable programmable processor, such as a microprocessor. The storage device 304 can include, for example, an Electrically Erasable Programmable Read-Only Memory (EEPROM) or other non-volatile memory device. The programmable processor 302 and the storage device 304 can be on a single die, separate dies, or can be incorporated into a chip scale package. The PLM information described above for the communication media 110 is stored in the storage device 304. The storage device 304 includes sufficient storage capacity to store such information.

The programmable processor 302 can be configured to communicate with a network entity 101 over the PLM interface 216. The PLM interface 216, while the corresponding connector 102 is inserted into a front connector of a port 104, communicatively couples the programmable processor 302 to the corresponding media reading interface 108 so that the programmable processor 106 in the corresponding network entity 101 can communicate with the programmable processor 302.

The programmable processor 302 can be secured to restrict unauthorized access to the PLM information on the storage device 304. This can include restrictions on reading from the storage device 304, as well as restrictions on storing data to the storage device 304. In an example, access to the storage device 304 and/or firmware of the programmable processor 302 by an outside entity such as the programmable processor 106, can be subject to providing a security code. In some examples, the firmware of the programmable processor 302 can be configured to implement an encryption algorithm to encrypt information sent over the PLM interface 216. The programmable processor 106 on a corresponding network entity 101 can be configured to provide such a security code and to perform encrypted communications with the programmable processor 302 in order to support such secure operation. Some information on the storage device 216 can be non-secure and can be provided by the programmable processor 302 without a security code in an unencrypted form.

In an example, the programmable processor 302 is configured to communicate with external entities, such as programmable processor 106 using a bidirectional serial communication link using Manchester coding. In other examples, other communication schemes can be used.

Example 2

Figure 4:
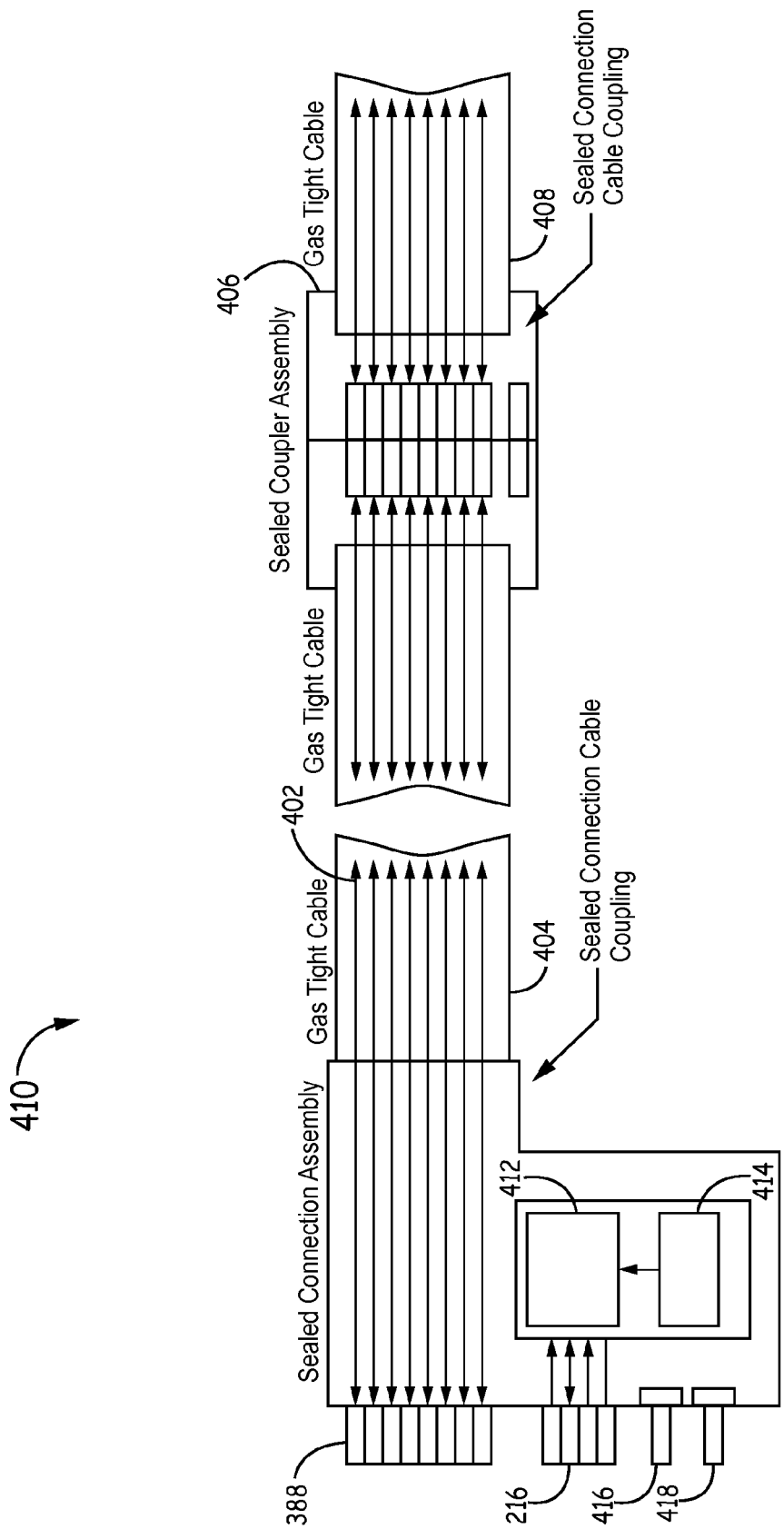
FIG. 4 is a block diagram of a portion of another example physical communication media having secured PLM information for use in the system of FIG. 1.

In Example 2, the physical communication media 410 that is used differs from the physical communication media 110 used in Example 1. The physical communication media 410 that is used in Example 2 is shown in FIG. 4. It is to be understood that, in practice, physical communication media 110 and physical communication media 410 may be used within the same network and possibly at the same network entity 101.

FIG. 4 illustrates another example of a physical communication media 410 that can implement secure PLM. The media 410 comprises one or more communication paths 402, such as one or more fiber optics or copper wires as described above. The one or more communication paths 402 can be at least partially contained within a hermetic enclosure 404. The hermetic enclosure can surround the one or more communication paths 402 and can extend at least partially from the connector 102 toward the other end of the media 410. The hermetic enclosure 404 can be used to maintain a hermetically sealed artificially low pressure environment around the one or more communication paths 402. In an example, the hermetic enclosure 404 can be maintained at a low pressure using di-nitrogen (N2) or desiccated air. In an example, the hermetic enclosure 404 can extend from the connector 102 at one end of the media 410 to a connector 102 on the other end of the media 410. In another example, the hermetic enclosure 404 can extend from the connector 102 to a sealed coupler assembly 406 in a middle portion of the media 401. A second hermetic enclosure 408 can be implemented on a similar manner from the sealed coupler assembly 406 to a connector 102 on the other end of the media 410.

Similar to Example 1, the connector 102 comprises a contact portion 388 in which eight, generally parallel electrical contacts are positioned, although other contact portions having other numbers of contacts and/or optical coupling components can be used. The connector 102 also comprises (or is attached to) a programmable processor and storage device 412 that can be implemented in a similar manner to programmable processor 302 and storage device 304 described with respect to Example 1. The programmable processor can include any suitable programmable processor, such as a microprocessor. The storage device can include, for example, an Electrically Erasable Programmable Read-Only Memory (EEPROM) or other non-volatile memory device. The programmable processor and the storage device can be on the same die, separate dies or can be incorporated into chip scale package. The PLM information described above for the communication media is stored in the storage device. The storage device includes sufficient storage capacity to store such information.

The programmable processor can be configured to communicate with a network entity 101 over the PLM interface 216. The PLM interface 216, while the corresponding connector 102 is inserted into a front connector of a port 104, communicatively couples the programmable processor 412 to the corresponding media reading interface 108 so that the programmable processor 412 in the corresponding network entity 101 can communicate with the programmable processor 412. The programmable processor 412 can be secured to restrict unauthorized access to the PLM information on the storage device similar to that described with respect to Example 1.

In this Example, the connector 102 also includes a pressure transducer 414 that is communicatively coupled to the programmable processor 412. The pressure transducer 414 can be configured to sense the pressure in the hermetic enclosure 404 and communicate such readings to the programmable processor 412. The connector 102 can also include a gas port 416 and a release valve 418 for adding and removing gas from the hermetical enclosure 404. A corresponding port 104 on a network entity 101 can include a corresponding gas port and release valve port.

Movement of the media 410 can cause changes in the pressure within the hermetic enclosure 404. This pressure change can then be sensed by the pressure transducer 414 and provided to the programmable processor 412. The programmable processor 412 can monitor such pressure readings from the pressure transducer 414 to detect possible intrusion events on the media 410. The programmable processor 412 can then provide an indication of such intrusion events to the network entity 101 over the PLM interface 216. The network entity 101 can then provide the indication to the aggregation point 152 for monitoring. In an example, the pressure readings themselves can be provided to the network entity 101 as the indication. In other examples, the programmable processor 412 can determine based on the pressure readings when a possible intrusion event has occurred and provide such information to the network entity 101.

In an example, while the connector 102 is inserted into port 104 pressurized media gas can be flowed into the hermetic enclosure 404 from the network entity 101. Once the hermetic enclosure 404 reaches the desired pressure, the system can be initialized by measuring the initial pressure condition over a defined period of time and storing the initial readings in the storage device 412 and/or providing the initial readings to the aggregation point 152. The programmable processor 412 and/or aggregation point 152 can then compare the initial readings with subsequent readings to determine whether a potential intrusion event has occurred. The initial readings can be used to identify normal variations in the pressure in order to reduce false positives.

In an example, a pressure system in the network entity 101 can periodically increase and decrease the pressure to form pressure pulses in the hermetical enclosure. The pressure pulses can be a form of signaling. The pressure transducer 414 can detect the periodicity and/or magnitude of the pressure pulses to determine whether a potential intrusion event has occurred. In an example, the pressure transducer 414 connected to the other end of the media 410 (i.e., the end of the media 410 that is opposite the end which is connected to network entity 101) can sense the pulses sent by the network entity 101, and information indicative of the pulses can be provided to a network entity 101 to which the other end of the media 410 is connected. This network entity 101 can determine whether the media 410 is still properly connected and/or to determine whether an intrusion event has occurred based on these pulses being properly sensed by the pressure transducer 414. The periodic pressure pulsing can be used to protect against the media 410 being artificially held at a constant pressure during an intrusion event.

Figure 5:
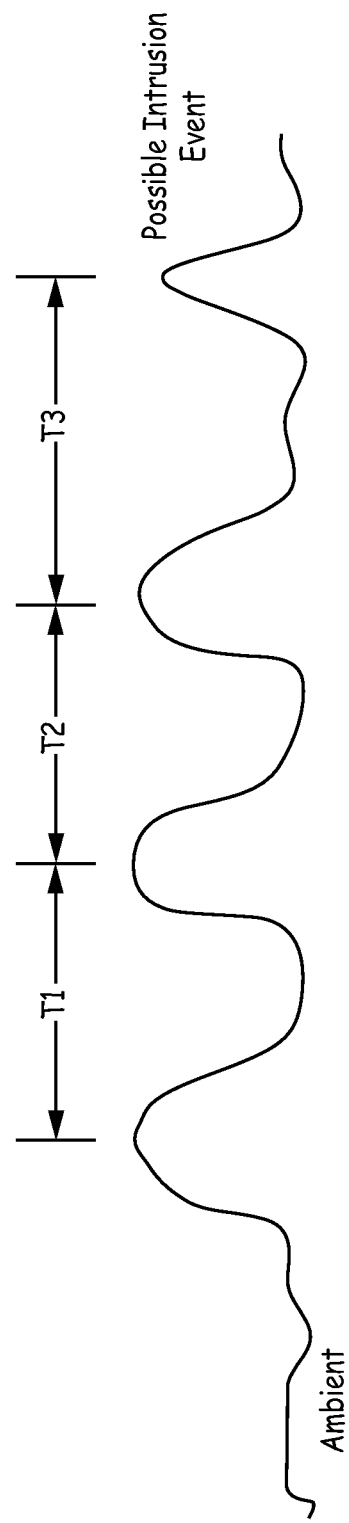
FIG. 5 illustrates an example of an intrusion event in the physical communication media of FIG. 4.

FIG. 5 illustrates an example of an intrusion event. As shown, a potential intrusion event can be identified by a difference in the period between pressure pulses. For example, if the period between pulses is not substantially equal (e.g., T1 does not equal T2), then the programmable processor 412 can notify the aggregation point 152 of a possible kink in the media 410. If, T1 equals T2, but T3 does not equal T1 or T2 then the programmable processor 412 can send an indication of a possible intrusion event to the aggregation point 152.

The pressure relief valve 418 can be used to periodically release pressure and then re-pressurize the hermetic enclosure 404 as an added security and maintenance check and to enable the network entity 101 to check operation of the pressure transducers 414.

Example 3

Figure 6:
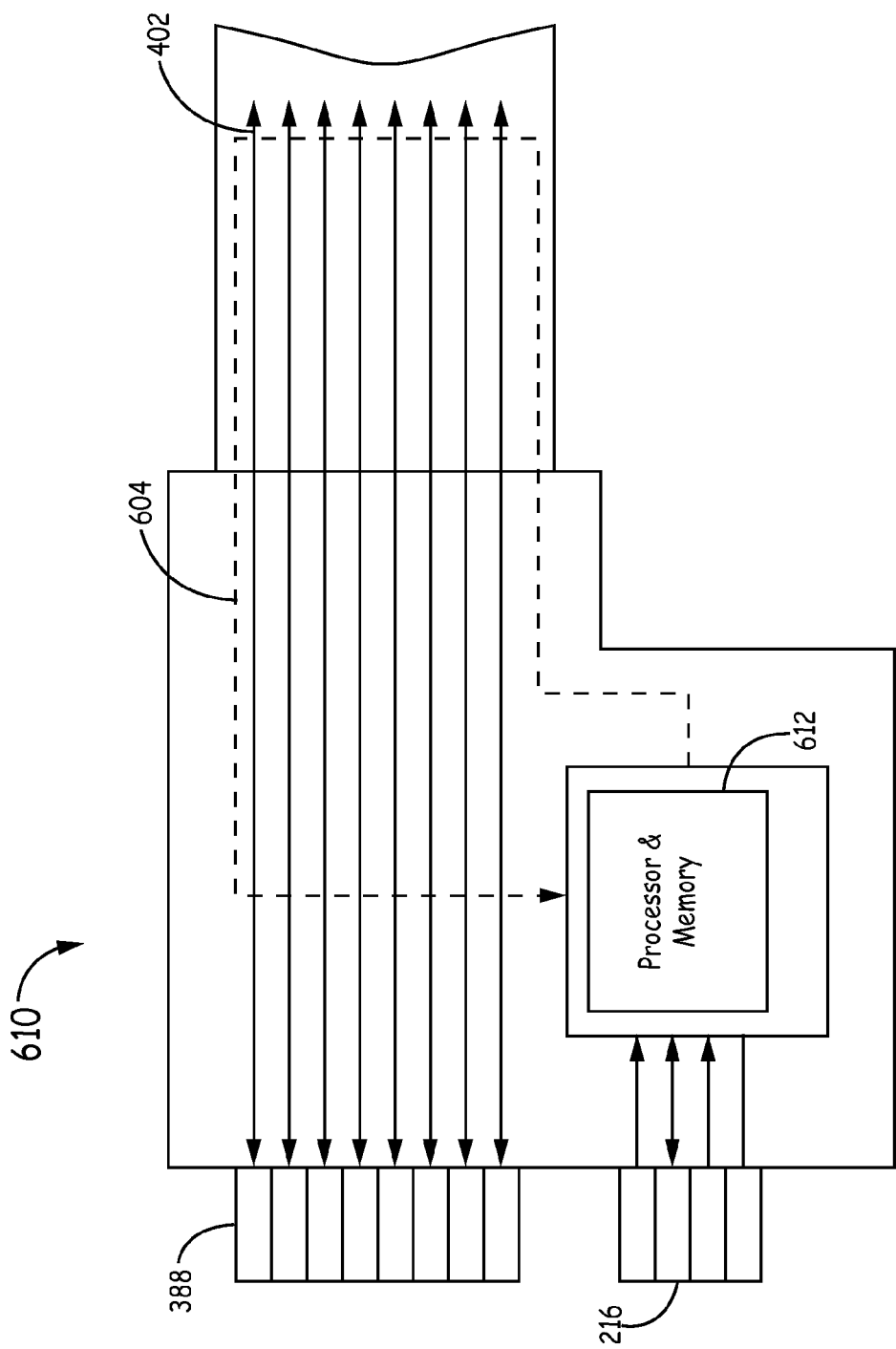
FIG. 6 is a block diagram of a portion of yet another example physical communication media having secured PLM information for use in the system of FIG. 1.

In Example 3, the physical communication media 610 that is used differs from the physical communication media 110 used in Example 1 and the physical communication media 410 used in Example 2. The physical communication media 610 that is used in Example 3 is shown in FIG. 6. It is to be understood that, in practice, physical communication media 110, physical communication media 410, and physical communication media 610 may be used within the same network and possibly at the same network entity 101.

FIG. 6 illustrates another example of a physical communication media 610 that can implement secure PLM. The media 610 comprises one or more communication paths 402, such as one or more fiber optics or copper wires as described above. Similar to Examples 1 and 2, the connector 102 comprises a contact portion 388 in which eight, generally parallel electrical contacts are positioned, although other contact portions having other numbers of contacts and/or optical coupling components can be used. The connector 102 also comprises (or is attached to) a programmable processor and storage device 612 that can be implemented in a similar manner to programmable processor 302 and storage device 304 described with respect to Example 1. The programmable processor can include any suitable programmable processor, such as a microprocessor, and can, for example, implement a digital signal processing (DSP) engine. The storage device can include, for example, an Electrically Erasable Programmable Read-Only Memory (EEPROM) or other non-volatile memory device. The programmable processor and the storage device can be on the same die, on separate dies, or can be incorporated into a chip scale package. The PLM information described above for the communication media is stored in the storage device. The storage device includes sufficient storage capacity to store such information.

The programmable processor can be configured to communicate with a network entity 101 over the PLM interface 216. The PLM interface 216, when the corresponding connector 102 is inserted into a front connector of a port 104, communicatively couples the programmable processor 612 to the corresponding media reading interface 108 so that the programmable processor 612 in the corresponding network entity 101 can communicate with the programmable processor 612. The programmable processor 612 can be secured to restrict unauthorized access to the PLM information on the storage device similar to that described with respect to Example 1.

In this Example, the media 610 also includes a wire (e.g., copper) loop 604 disposed adjacent the one or more communication paths 404 and extending at least partially from the connector 102 towards the other end of the media 610. In some examples, the wire loop 604 is connected to a terminating impedance. The programmable processor 612 can be coupled to the wire loop 604 and configured to send a sinusoidal "test" signal through the wire loop 604. The programmable processor 612 can then sense the wire loop 604 and measure the amplitude and phase of the received test signal. Movement of the media 610 will cause a phase change indicating a possible intrusion event. In an example, the programmable processor 612 can change (e.g., rotate) the frequency of the test signal, for example, randomly or periodically. Rotating the frequency can make it more difficult for an intruder to generate an external signal that will match the test signal and apply such external signal to the wire loop 604 to mask an intrusion.

In an example, the wire loop 604 can extend from the connector 102 to a connector 102 at the other end of the media 610. In an implementation of such an example, a programmable processor 612 on one end of the media 610 can provide a signal on the wire loop 604 and a programmable processor 612 on the other end of the media 610 can sense the signal to detect possible intrusion events. The programmable processors 612 on opposite ends of the media 610 can alternate in sending such a signal. In another example, the media 610 can include two wire loops, each wire loop coupled to a programmable processor on a respective end of the media 610.

In another example, the media 610 can include a double shielding disposed adjacent (e.g., surrounding) the one or more communication paths 404 and extending at least partially from the connector 102 towards the other end of the media 601. The programmable processor 612 can be coupled to the double shielding and configured to send a signal (e.g., sinusoidal) through the double shielding. In some examples, the programmable processor 612 can then sense the signal on the double shielding and measure the amplitude and phase of thereof. Movement of the media 610 can cause a capacitance change and subsequent phase change which can be measured by the programmable processor 612 to determine an intrusion event. In an example, the double shielding can extend from the connector 102 at one end of the media 610 to a connector 102 on the other end of the media 410. In an implementation of such an example, a programmable processor 612 on one end of the media 610 can provide a "test" signal on the double shielding and a programmable processor 612 on the other end of the media 610 can sense the signal to detect possible intrusion events. The programmable processors 612 on opposite ends of the media 610 can alternate in sending such a signal. In another example, the media 610 can include two distinct double shields, each double shield coupled to a programmable processor on a respective end of the media 610. In some examples, the programmable processor 612 can change (e.g., rotate) the frequency of the test signal, for example, randomly or periodically. Rotating the frequency can make it more difficult for an intruder to generate an external signal that will match the test signal and apply such external signal to the double shielding to mask an intrusion.

In some examples, in addition to or instead of using such double shielding as a means for detection of intrusion events, the double shielding can be used to create an interference field to limit electromagnetic pickup on copper cables. In such an example, the programmable processor 612 can apply a sinusoidal voltage of sufficient magnitude to create an interference field to saturate low level receivers used for signal pickup. In some examples, the sinusoidal frequency can be changed (e.g., rotated) on a random algorithm to make filtering of the interference signal using FFT or DSP methods difficult.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Further details, embodiments, and implementations can be found in the following United States Patent Applications, all of which are hereby incorporated herein by reference:

U.S. Provisional Patent Application Ser. No. 61/152,624, filed on Feb. 13, 2009, titled "MANAGED CONNECTIVITY SYSTEMS AND METHODS" (also referred to here as the "'624 application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 application);

U.S. patent application Ser. No. 12/705,501, filed on Feb. 12, 2010, titled "INTER-NETWORKING DEVICES FOR USE WITH PHYSICAL LAYER INFORMATION" (also referred to here as the '501 Application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 application); U.S. patent application Ser. No. 12/705,514, filed on Feb. 12, 2010, titled "MANAGED CONNECTIVITY DEVICES, SYSTEMS, AND METHODS" (also referred to here as the '514 application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"); U.S. Provisional Patent Application Ser. No. 61/303,961, filed on Feb. 12, 2010, titled "FIBER PLUGS AND ADAPTERS FOR MANAGED CONNECTIVITY" (the "'961 application"); and U.S. Provisional Patent Application Ser. No. 61/303,948, filed on Feb. 12, 2010, titled "BLADED COMMUNICATIONS SYSTEM" (the "'948 application"); U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303, 948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; United States Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303, 961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS"; U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM"; U.S. Provisional Patent Application Ser. No. 61/467,725, filed on Mar. 25, 2011, titled "DYNAMICALLY DETECTING A DEFECTIVE CONNECTOR AT A PORT"; U.S. Provisional Patent Application Ser. No. 61/467,729, filed on Mar. 25, 2011, titled "IDENTIFIER ENCODING SCHEME FOR USE WITH MULTI-PATH CONNECTORS"; U.S. Provisional Patent Application Ser. No. 61/467, 736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS"; and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

Example Embodiments

Example 1 includes a communication media comprising: one or more communication paths extending from a first end to a second end; a first connector assembly terminating the first end of the one or more communication paths, the first connector assembly including a physical layer management (PLM) interface that is isolated from signals on the one or more communication paths, the first connector assembly including a programmable processor coupled to a storage device, the programmable processor coupled to the PLM interface, wherein the programmable processor is configured to perform secure communications with another device coupled to the PLM interface to communicate physical layer information regarding the communication media to the other device; and a second connector assembly terminating the second end of the one or more communication paths; whereby an aggregation point can associate a first port on the other device to which the first connector assembly is inserted with the first connector assembly or the communication media using the physical layer information.

Example 2 includes the communication media of Example 1, wherein the programmable processor is configured to require a code to be input before providing at least a portion of the physical layer information therefrom.

Example 3 includes the communication media of any of Examples 1 or 2, wherein the programmable processor is configured to encrypt the physical layer information when sent over the PLM interface.

Example 4 includes the communication media of any of Examples 1-3, wherein the second connector assembly includes a second PLM interface that is isolated from the signals on the one or more communication paths, the second connector assembly including a second programmable processor coupled to a second storage device, the second programmable processor coupled to the second PLM interface, wherein the second programmable processor is configured to perform secure communications with second other device coupled to the second PLM interface to communicate physical layer information regarding the communication media to the second other device.

Example 5 includes a communication media comprising: one or more communication paths extending from a first end to a second end; a hermetically sealed enclosure surrounding at least a portion of the one or more communication paths; and a first connector assembly terminating the first end of the one or more communication paths, the first connector assembly including: a PLM interface that is isolated from signals on the one or more communication paths; a storage device; a programmable processor coupled to the storage device and the PLM interface, wherein the programmable processor is configured to communicate physical layer information regarding the communication media with another device coupled to the PLM interface; and a pressure transducer coupled to the programmable processor and configured to sense a pressure in the hermetically sealed enclosure, wherein the programmable processor is configured to communicate pressure information indicative of pressure readings from the pressure transducer to the other device; whereby an aggregation point can associate a first port on the other device to which the first connector assembly is inserted with the first connector assembly or the communication media with the physical layer information and the aggregation point can monitor potential intrusion events of the communication media based on the pressure information.

Example 6 includes the communication media of Example 5, wherein the first connector includes a gas port for inserting and removing gas from the hermetically sealed enclosure.

Example 7 includes the communication media of any of Examples 5 or 6, comprising: a second connector assembly terminating the second end of the one or more communication paths; a second PLM interface that is isolated from the signals on the one or more communication paths; a second storage device; a second programmable processor coupled to the second storage device and the second PLM interface, wherein the second programmable processor is configured to communicate physical layer information regarding the communication media with a second other device coupled to the second PLM interface; and a second pressure transducer coupled to the second programmable processor and configured to sense a pressure in the hermetically sealed enclosure, wherein the second programmable processor is configured to communicate pressure information indicative of pressure readings from the second pressure transducer to the second other device.

Example 8 includes the communication media of Example 7, wherein the other device is configured to periodically increase and decrease pressure in the hermetically sealed enclosure to form pressure pulses, wherein an intrusion event is determined based on sensing of the pressure pulses by the second pressure transducer.

Example 9 includes the communication media of any of Examples 5-8, wherein the hermetically sealed enclosure includes a first hermetically sealed enclosure, and wherein the communication media comprises a sealed coupler assembly configured to form a first end of the first hermetically sealed enclosure wherein a second end of the first hermetically sealed enclosure is formed by the first connector assembly, wherein the communication media includes a second connector assembly terminating the second end of the one or more communication paths, wherein the communication media includes a second hermetically sealed enclosure having a first end formed by the sealed coupler assembly and a second end formed by the second connector assembly; wherein the second connector assembly includes: a second PLM interface that is isolated from the signals on the one or more communication paths; a second storage device; a second programmable processor coupled to the second storage device and the second PLM interface, wherein the second programmable processor is configured to communicate physical layer information regarding the communication media with a second other device coupled to the second PLM interface; and a second pressure transducer coupled to the second programmable processor and configured to sense a pressure in the hermetically sealed enclosure, wherein the second programmable processor is configured to communicate pressure information indicative of pressure readings from the second pressure transducer to the second other device.

Example 10 includes the communication media of any of Examples 5-9, wherein the programmable processor is configured to analyze the pressure information and provide indications of potential intrusion events to the other device for forwarding to the aggregation point.

Example 11 includes the communication media of any of Examples 5-10, wherein the programmable processor is configured to send the pressure information to the other device for forwarding to the aggregation point for analyzing at the aggregation point for potential intrusion events.

Example 12 includes the communication media of any of Examples 5-11, wherein at least one of the programmable processor, the other device, or the aggregation point is configured to obtain an initial pressure condition corresponding to a pressure of the hermetically sealed enclosure over a defined period of time and compare subsequent pressure readings against the initial pressure condition when determining if an potential intrusion event has occurred.

Example 13 includes a communication media comprising: one or more communication paths extending from a first end to a second end; a wire loop extending from the first end toward the second end adjacent the one or more communication paths; a first connector assembly terminating the first end of the one or more communication paths, the first connector assembly including: a PLM interface that is isolated from the signals on the one or more communication paths; a storage device; and a programmable processor coupled to the storage device and the PLM interface, wherein the programmable processor is configured to communicate physical layer information regarding the communication media with another device coupled to the PLM interface, the programmable processor coupled to the wire loop and configured to send a signal on a first terminal of the wire loop and measure an amplitude or phase of the signal at a second terminal of the wire loop; a second connector assembly terminating the second end of the one or more communication paths; whereby an aggregation point can associate a first port on the other device to which the first connector assembly is inserted with the first connector assembly or the communication media with the physical layer information and the aggregation point can monitor potential intrusion events of the communication media based on the measured amplitude or phase of the signal.

Example 14 includes the communication media of Example 13, wherein the programmable processor is configured to analyze the measured amplitude or phase of the signal and provide indications of potential intrusion events to the other device for forwarding to the aggregation point.

Example 15 includes the communication media of any of Examples 13 or 14, wherein the programmable processor is configured to send the measured amplitude or phase of the signal to the other device for forwarding to the aggregation point for analyzing at the aggregation point for potential intrusion events.

Example 16 includes the communication media of any of Examples 13-15, wherein the programmable processor is configured to rotate the frequency of the signal.

Example 17 includes the communication media of any of Examples 13-16, wherein at least one of the programmable processor, the other device, or the aggregation point is configured to obtain an initial condition corresponding to a signal on the wire loop over a defined period of time and compare subsequent readings against the initial condition when determining if an potential intrusion event has occurred.

Example 18 includes a communication media comprising: one or more communication paths extending from a first end to a second end; a double walled shielding extending from the first end toward the second end adjacent the one or more communication paths; a first connector assembly terminating the first end of the one or more communication paths, the first connector assembly including: a PLM interface that is isolated from the signals on the one or more communication paths; a storage device; and a programmable processor coupled to the storage device and the PLM interface, wherein the programmable processor is configured to communicate physical layer information regarding the communication media with another device coupled to the PLM interface, the programmable processor coupled to the double walled shielding and configured to sense a capacitance between the walls of the double walled shielding; a second connector assembly terminating the second end of the one or more communication paths; whereby an aggregation point can associate a first port on the other device to which the first connector assembly is inserted with the first connector assembly or the communication media with the physical layer information and the aggregation point can monitor potential intrusion events of the communication media based on the sensed capacitance.

Example 19 includes the communication media of Example 18, wherein the programmable processor is configured to analyze the sensed capacitance and provide indications of potential intrusion events to the other device for forwarding to the aggregation point.

Example 20 includes the communication media of any of Examples 18 or 19, wherein the programmable processor is configured to send the sensed capacitance to the other device for forwarding to the aggregation point for analyzing at the aggregation point for potential intrusion events.

Example 21 includes the communication media of any of Examples 18-20, wherein the second connector assembly includes: a second PLM interface that is isolated from the signals on the one or more communication paths; a second storage device; and a second programmable processor coupled to the second storage device and the PLM interface, wherein the second programmable processor is configured to communicate physical layer information regarding the communication media with a second other device coupled to the second PLM interface, the second programmable processor coupled to the double walled shielding and configured to sense a capacitance between the walls of the double walled shielding; wherein the programmable processor is configured to send a signal between the walls of the double walled shielding and wherein the second programmable processor is configured to measure an amplitude or phase of the signal on the double walled shielding.

Example 22 includes the communication media of Example 21, wherein the programmable processor is configured to rotate the frequency of the test signal.

Example 23 includes the communication media of any of Examples 18-22, wherein at least one of the programmable processor, the other device, or the aggregation point is configured to obtain an initial condition corresponding to a capacitance on the double walled shielding over a defined period of time and compare subsequent readings against the initial condition when determining if an potential intrusion event has occurred.

What is claimed is:
1. A communication media comprising:
   a cable including:
      one or more communication paths extending from a first end to a second end;
      a first connector assembly terminating the first end of the one or more communication paths, the first connector assembly including a physical layer management (PLM) interface that is isolated from signals on the one or more communication paths, the first connector assembly including a programmable processor coupled to a storage device, the programmable processor coupled to the PLM interface, wherein the programmable processor is configured to perform secure communications with another device coupled to the PLM interface to communicate physical layer information regarding the communication media to the other device; and
      a second connector assembly terminating the second end of the one or more communication paths;
   whereby an aggregation point can associate a first port on the other device to which the first connector assembly is inserted with the first connector assembly or the communication media using the physical layer information.

2. The communication media of claim 1, wherein the programmable processor is configured to require a code to be input before providing at least a portion of the physical layer information therefrom.

3. The communication media of claim 1, wherein the programmable processor is configured to encrypt the physical layer information sent over the PLM interface.

4. The communication media of claim 1, wherein the second connector assembly includes a second PLM interface that is isolated from the signals on the one or more communication paths, the second connector assembly including a second programmable processor coupled to a second storage device, the second programmable processor coupled to the second PLM interface, wherein the second programmable processor is configured to perform secure communications with a second other device coupled to the second PLM interface to communicate physical layer information regarding the communication media to the second other device.

5. A communication media comprising:
   one or more communication paths extending from a first end to a second end;
   a hermetically sealed enclosure surrounding at least a portion of the one or more communication paths; and a first connector assembly terminating the first end of the one or more communication paths, the first connector assembly including:
a PLM interface that is isolated from signals on the one or more communication paths;
a storage device;
a programmable processor coupled to the storage device and the PLM interface, wherein the programmable processor is configured to communicate physical layer information regarding the communication media with another device coupled to the PLM interface; and
a pressure transducer coupled to the programmable processor and configured to sense a pressure in the hermetically sealed enclosure, wherein the programmable processor is configured to communicate pressure information indicative of pressure readings from the pressure transducer to the other device;
whereby an aggregation point can associate a first port on the other device to which the first connector assembly is inserted with the first connector assembly or the communication media with the physical layer information and the aggregation point can monitor potential intrusion events of the communication media based on the pressure information.

6. The communication media of claim 5, wherein the first connector includes a gas port for inserting and removing gas from the hermetically sealed enclosure.

7. The communication media of claim 5, comprising:
a second connector assembly terminating the second end of the one or more communication paths;
a second PLM interface that is isolated from the signals on the one or more communication paths;
a second storage device;
a second programmable processor coupled to the second storage device and the second PLM interface, wherein the second programmable processor is configured to communicate physical layer information regarding the communication media with a second other device coupled to the second PLM interface; and
a second pressure transducer coupled to the second programmable processor and configured to sense a pressure in the hermetically sealed enclosure, wherein the second programmable processor is configured to communicate pressure information indicative of pressure readings from the second pressure transducer to the second other device.

8. The communication media of claim 7, wherein the other device is configured to periodically increase and decrease pressure in the hermetically sealed enclosure to form pressure pulses, wherein an intrusion event is determined based on sensing of the pressure pulses by the second pressure transducer.

9. The communication media of claim 5, wherein the hermetically sealed enclosure includes a first hermetically sealed enclosure, and wherein the communication media comprises a sealed coupler assembly configured to form a first end of the first hermetically sealed enclosure wherein a second end of the first hermetically sealed enclosure is formed by the first connector assembly,
wherein the communication media includes a second connector assembly terminating the second end of the one or more communication paths, wherein the communication media includes a second hermetically sealed enclosure having a first end formed by the sealed coupler assembly and a second end formed by the second connector assembly;
wherein the second connector assembly includes:
a second PLM interface that is isolated from the signals on the one or more communication paths;
a second storage device;
a second programmable processor coupled to the second storage device and the second PLM interface, wherein the second programmable processor is configured to communicate physical layer information regarding the communication media with a second other device coupled to the second PLM interface; and
a second pressure transducer coupled to the second programmable processor and configured to sense a pressure in the hermetically sealed enclosure, wherein the second programmable processor is configured to communicate pressure information indicative of pressure readings from the second pressure transducer to the second other device.

10. The communication media of claim 5, wherein the programmable processor is configured to analyze the pressure information and provide indications of potential intrusion events to the other device for forwarding to the aggregation point.

11. The communication media of claim 5, wherein the programmable processor is configured to send the pressure information to the other device for forwarding to the aggregation point for analyzing at the aggregation point for potential intrusion events.

12. The communication media of claim 5, wherein at least one of the programmable processor, the other device, or the aggregation point is configured to obtain an initial pressure condition corresponding to a pressure of the hermetically sealed enclosure over a defined period of time and compare subsequent pressure readings against the initial pressure condition when determining if an potential intrusion event has occurred.

13. A communication media comprising:
one or more communication paths extending from a first end to a second end;
a wire loop extending from the first end toward the second end adjacent the one or more communication paths;
a first connector assembly terminating the first end of the one or more communication paths, the first connector assembly including:
a PLM interface that is isolated from the signals on the one or more communication paths;
a storage device; and
a programmable processor coupled to the storage device and the PLM interface, wherein the programmable processor is configured to communicate physical layer information regarding the communication media with another device coupled to the PLM interface, the programmable processor coupled to the wire loop and configured to send a signal on a first terminal of the wire loop and measure an amplitude or phase of the signal at a second terminal of the wire loop;
a second connector assembly terminating the second end of the one or more communication paths;
whereby an aggregation point can associate a first port on the other device to which the first connector assembly is inserted with the first connector assembly or the communication media with the physical layer information and the aggregation point can monitor potential intrusion events of the communication media based on the measured amplitude or phase of the signal.

14. The communication media of claim 13, wherein the programmable processor is configured to analyze the measured amplitude or phase of the signal and provide indications of potential intrusion events to the other device for forwarding to the aggregation point.

15. The communication media of claim 13, wherein the programmable processor is configured to send the measured amplitude or phase of the signal to the other device for forwarding to the aggregation point for analyzing at the aggregation point for potential intrusion events.

16. The communication media of claim 13, wherein the programmable processor is configured to rotate the frequency of the signal.

17. The communication media of claim 13, wherein at least one of the programmable processor, the other device, or the aggregation point is configured to obtain an initial condition corresponding to a signal on the wire loop over a defined period of time and compare subsequent readings against the initial condition when determining if an potential intrusion event has occurred.

18. A communication media comprising:
one or more communication paths extending from a first end to a second end;
a double walled shielding extending from the first end toward the second end adjacent the one or more communication paths;
a first connector assembly terminating the first end of the one or more communication paths, the first connector assembly including:
a PLM interface that is isolated from the signals on the one or more communication paths;
a storage device; and
a programmable processor coupled to the storage device and the PLM interface, wherein the programmable processor is configured to communicate physical layer information regarding the communication media with another device coupled to the PLM interface, the programmable processor coupled to the double walled shielding and configured to sense a capacitance between the walls of the double walled shielding;
a second connector assembly terminating the second end of the one or more communication paths;
whereby an aggregation point can associate a first port on the other device to which the first connector assembly is inserted with the first connector assembly or the communication media with the physical layer information and the aggregation point can monitor potential intrusion events of the communication media based on the sensed capacitance.

19. The communication media of claim 18, wherein the programmable processor is configured to analyze the sensed capacitance and provide indications of potential intrusion events to the other device for forwarding to the aggregation point.

20. The communication media of claim 18, wherein the programmable processor is configured to send the sensed capacitance to the other device for forwarding to the aggregation point for analyzing at the aggregation point for potential intrusion events.

21. The communication media of claim 18, wherein the second connector assembly includes:
a second PLM interface that is isolated from the signals on the one or more communication paths;
a second storage device; and
a second programmable processor coupled to the second storage device and the PLM interface, wherein the second programmable processor is configured to communicate physical layer information regarding the communication media with a second other device coupled to the second PLM interface, the second programmable processor coupled to the double walled shielding and configured to sense a capacitance between the walls of the double walled shielding;
wherein the programmable processor is configured to send a signal between the walls of the double walled shielding and wherein the second programmable processor is configured to measure an amplitude or phase of the signal on the double walled shielding.

22. The communication media of claim 21, wherein the programmable processor is configured to rotate the frequency of the test signal.

23. The communication media of claim 18, wherein at least one of the programmable processor, the other device, or the aggregation point is configured to obtain an initial condition corresponding to a capacitance on the double walled shielding over a defined period of time and compare subsequent readings against the initial condition when determining if an potential intrusion event has occurred.

* * * * *